Figure 1:
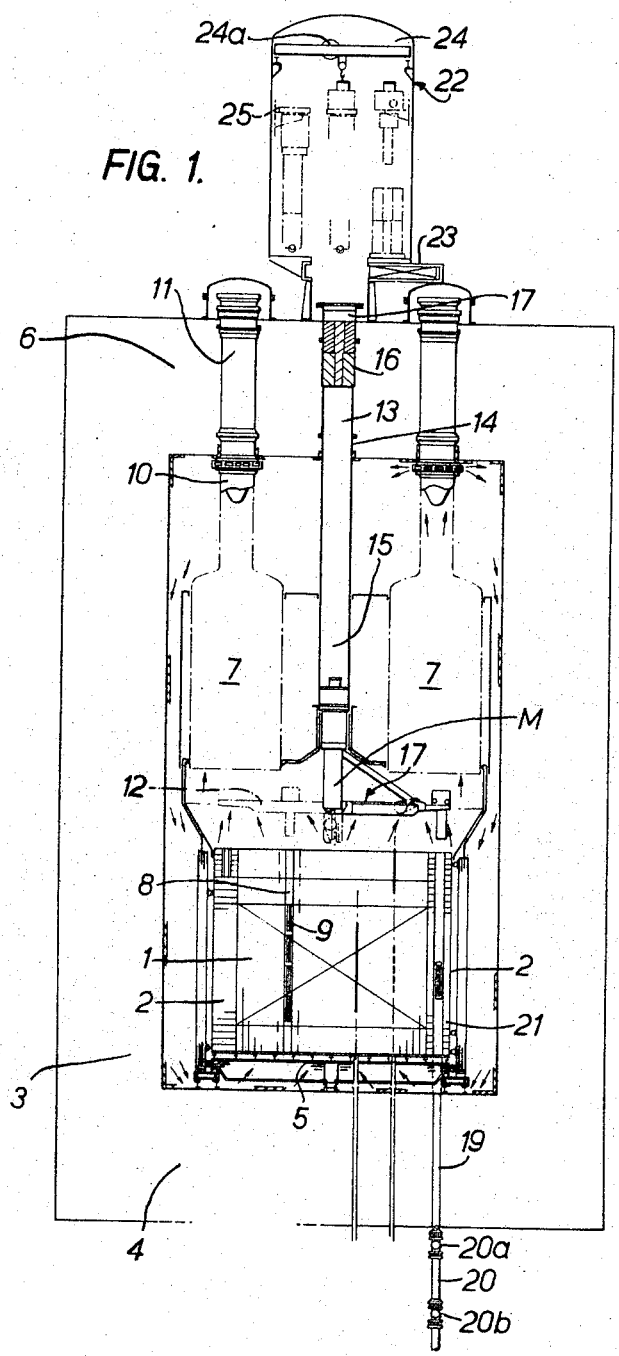

Aug. 15, 1967  G. E. LOCKETT ET AL  3,336,202
CHARGE/DISCHARGE MACHINES FOR NUCLEAR REACTORS
Filed March 29, 1965  6 Sheets-Sheet 2
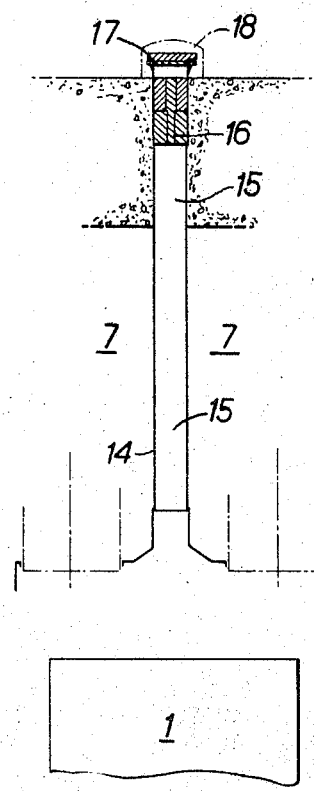
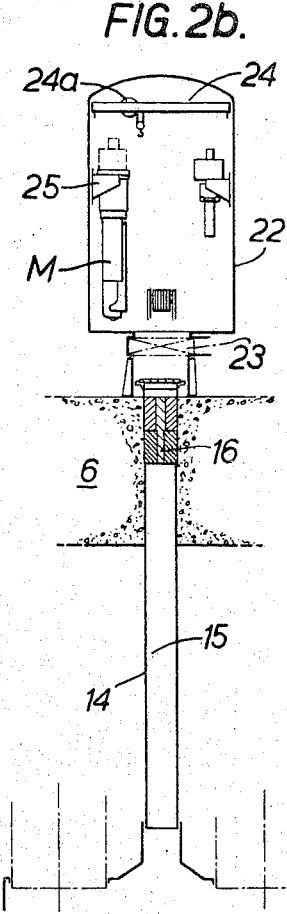

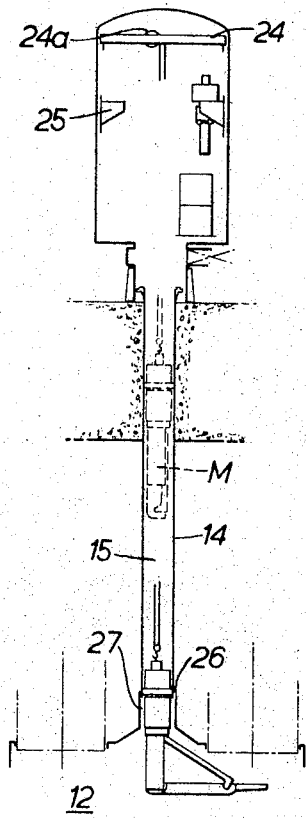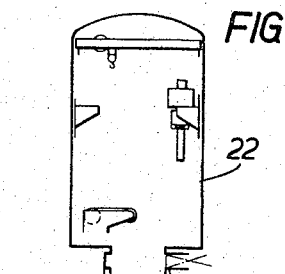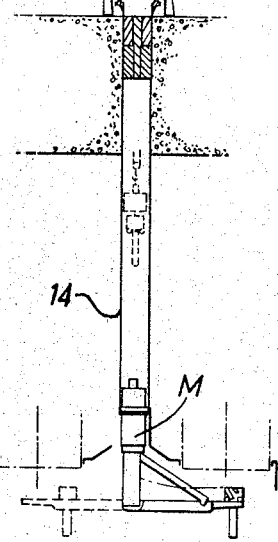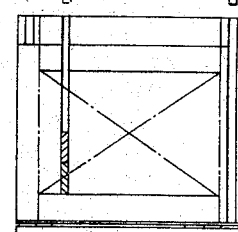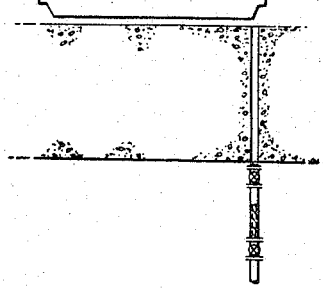

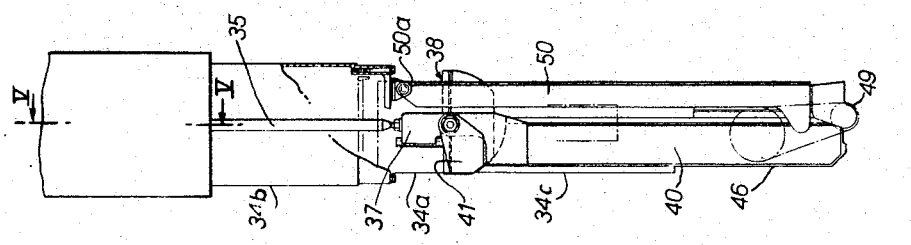
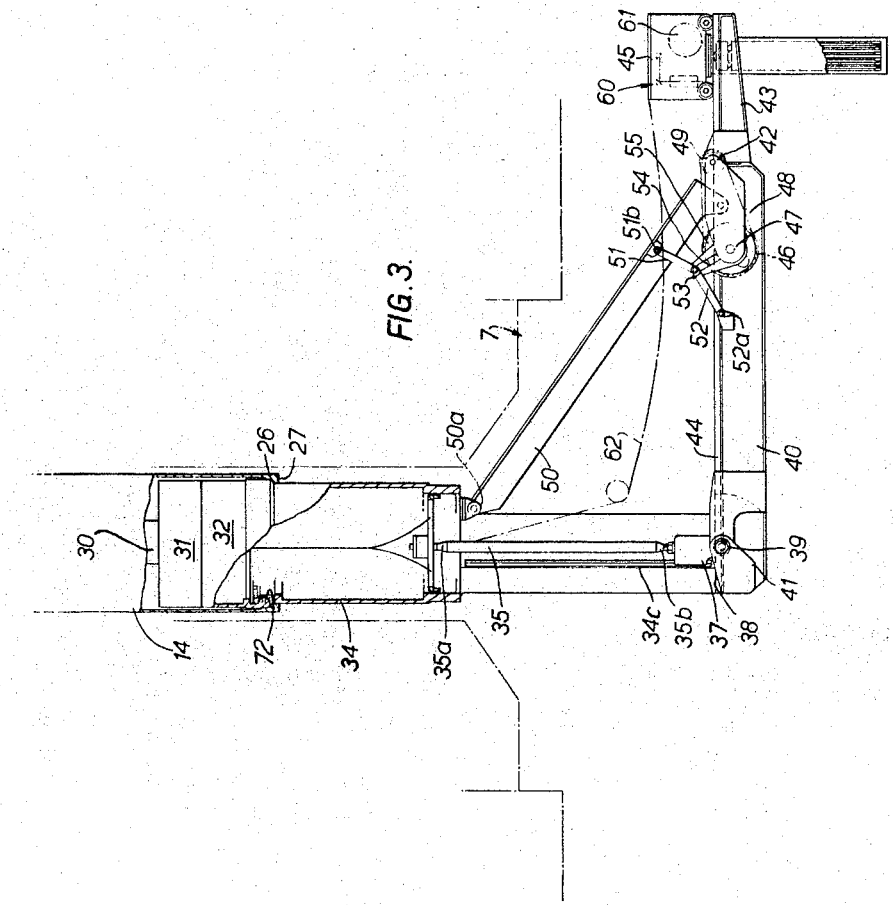

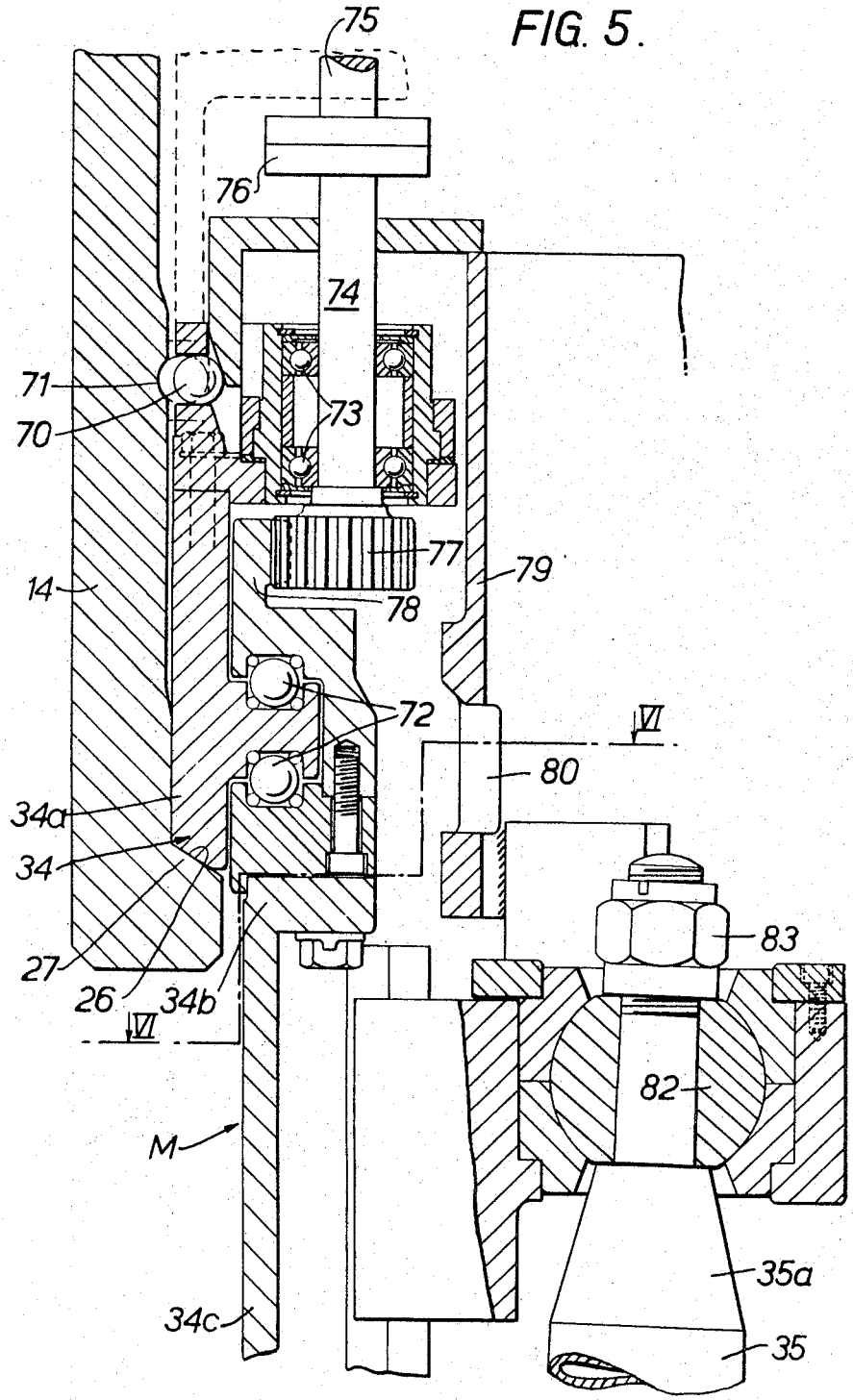

United States Patent Office 3,336,202
Patented Aug. 15, 1967

3,336,202
CHARGE/DISCHARGE MACHINES FOR NUCLEAR REACTORS
George Edward Lockett, Poole, Dorset, and John Pugh, Dorchester, Dorset, England, assignors to United Kingdom Atomic Energy Authority, London, England
Filed Mar. 29, 1965, Ser. No. 443,501
Claims priority, application Great Britain, Apr. 6, 1964, 14,197/64
6 Claims. (Cl. 176—30)

This invention relates to gas cooled nuclear reactors and is chiefly concerned with improvements in re-fuelling arrangements for such reactors.

A gas cooled reactor usually has a core in which a number of parallel channels extend through moderating material and in those channels fuel elements are inserted endwise. The core is contained in a pressure vessel together with at least a part of the primary side of the heat exchange circuit and it is not uncommon to provide a number of penetrations in the pressure vessel which register with one, or a group of these channels, so as to allow, after depressurisation of the reactor, the introduction of a fuel manipulating tool. By means of this tool fuel elements may be introduced, withdrawn or shuffled with respect to the core. However, a large number of penetrations of the pressure vessel is undesirable owing to the consequential reduction of structural strength and an alternative approach has been made to this problem in the forming of a single penetration in the vessel through which fuel elements may be transferred. For example, the charge machine may be retained within a part of the pressure vessel protected by shield plugs as in the Dragon gas cooled reactor or alternatively the charge machine may be put into the pressure vessel through a single penetration after the reactor has been shut down in order to serve a number of channels.

However, in present designs the form of charge machines used for operation within the vessel have necessitated that the pressure vessel needs to be made very much larger than would otherwise be the case. Moreover, a complicated mechanical drive system is required in order to operate the charge machine which is required to rotate above the axis of the core, to move in the transverse direction across the core and to move in a plane normal to said transverse direction across the top of the core.

It is an object of the present invention to provide an improved system or re-fuelling a gas cooled reactor.

It has previously been proposed to provide for a reactor pressure vessel of a nuclear reactor plant, the pressure vessel enclosing a reactor core having a number of vertically extending fuel element-containing channels, a first penetration in said vessel to give access to an end face of the core intersected by said channels, a charge/discharge machine comprising erectable means introducible into the pressure vessel in a folded condition and erectable therein to form a track, a fuel element handling trolley mounted to run on the track and means for rotating the track in a horizontal plane.

According to a feature of the invention there is provided a charge machine for a nuclear reactor core situated within a pressure vessel having a penetration therein through which the machine is introducible for operation, the machine comprising a housing arranged to extend into and through the penetration, a track for a charging trolley hingedly mounted within said housing by a first hinge connection and pivotal about the connection into an unfolded position, a track extension hingedly mounted by a second connection on the track so as to be pivotable between positions in which the extension lies co-extensive with the track in the folded position or to form an extension thereof in an unfolded position and actuating means operative to unfold said track extension in response to pivotal movement of the track about said first hinged connection to unfold the track from said housing.

According to a further feature of the present invention a reactor installation comprising a reactor core having a number of vertically extending fuel element channels, a pressure vessel enclosing the core, a first penetration in the said vessel above the core, a charge/discharge machine, said machine including erectable means forming in effect a track, said means being capable of introduction through said first penetration to be erected so as to be rotatable in a horizontal attitude above the fuel element channels, said machine also comprising a trolley movable on the track and carrying a fuel element handling means and said core having a fuel element transfer passageway registering with a second pressure vessel penetration beneath the core.

The above and other features of the invention will appear from the following description in which reference is made to the accompanying drawings, FIGS. 1–6.

Figure 6:
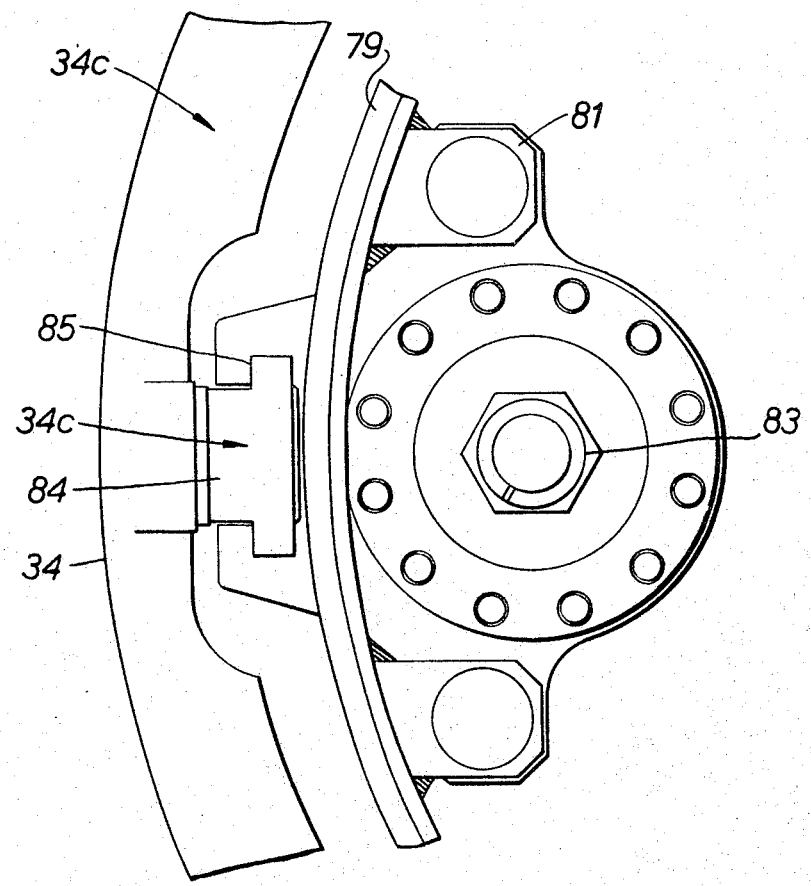

In the drawings:

FIG. 1 is a diagrammatic cross-section of a gas cooled reactor to which the invention is applicable, FIGS. 2a–2d show diagrammatically the fuel transfer sequence of fuel transfer operations, and FIGS. 3 and 4 are diagrammatic views of the charge/discharge machine shown in unfolded and folded positions respectively, FIG. 5 is a fragmentary cross-section on the line V—V of FIG. 4, FIG. 6 is part plan view on line VI—VI of FIG. 5.

FIG. 1 shows the general arrangement of the reactor to which the charge/discharge method is applied by way of a particular example. The core 1 of generally right cylindrical form, and circumscribed by a reflector 2, is enclosed in a concrete pressure vessel 3. The vessel 3 has a bottom slab 4 which supports a base plate 5 on which the core rests, while from structural members, adjacent to the top cap 6 of the vessel, heat exchangers 7 are suspended. Coolant flow at pressure is induced through channels 8 containing fuel elements 9 in an upward direction by circulators 10 suspended from the top cap 6 which has penetrations 11 through which the circulators are independently withdrawable for maintenance. The space 12 above the core thus forms a hot gas plenum chamber through which the gas from the core passes before entering the exchanger inlets; the outlet gas from the circulators is directed to pass around the inner face of the pressure vessel, ultimately to re-enter the core channels 8 through holes in the base plate.

It is proposed to effect re-fuelling operation of the core by means of a charge/discharge machine indicated generally at M which is kept outside the pressure vessel during operation of the reactor and only introduced into the vessel at reactor shutdown and after depressurisation of the pressure vessel. Centrally above the core, on the core axis, the pressure vessel top cap 6 is pierced by a first penetration 13 which is lined with a tube 14. The latter depends at its lower end into the pressure vessel forming a well 15 between the heat exchangers 7. During normal operation of the reactor, the hole 13 in the top cap is closed by shield plugs 16 to prevent neutron streaming and sealed gas tight by a cover plate 17. This plate is covered again by a second containment cover 18 (FIG. 2a). The well 15 serves for the introduction of the charge machine M. To allow withdrawal of fuel elements from the pressure vessel there is formed a penetration 19 which registers externally of the pressure vessel with a chute 20, access through which is controlled by gas lock valve 20a, 20b. Within the pressure vessel, the penetration 19 registers with a channel 21 extending through annular reflector 2. When it is required to fuel, re-fuel the core or shuffle fuel within the reactor core, the reactor is shut-down by actuation of the usual core shut-down mechanisms, in this case control absorbers (not shown) inserted from beneath the core, the vessel pressure is then reduced to atmospheric and charge machine containment shell 22 is moved into position on top of the top cap 6 as shown in FIGURE 2b. The containment shell has a gate valve 23 which is brought into register over the pressure vessel penetration 13. The containment shell contains a rail 24 for a winch 24a which can be moved to operate over any position within the containment shell, and over one of several storage racks 25 on which the charge machine M can be deposited when out of use. Having depressurised the interior of the pressure vessel, the cover plates 17, 18, and the shield plugs 16 are removed remotely by the winch 24a and placed on one of the radial storage racks 25 within the containment shell. The winch 24a now engages a charge machine M, which is in its folded condition for storage, and lowers this component through the penetration 13 and down the well 15 between the heat exchangers (FIG. 2c). As the charge machine nears the bottom end of the well a flange 26 on the exterior of the machine engages an internal shoulder 27 in the tube and thereafter the weight of the machine is taken by the tube 14 which lines the well. At this stage about two-thirds of the overall length of the machine projects into the plenum chamber 12 and this is now free to unfold under gravity into a horizontal position (FIG. 2d). This action may be achieved by providing a latch which retains the foldable portion of the machine in the folded position until the latch becomes disengaged by a detent towards the lower end of the well, thus allowing unfolding to occur. This prevents any tendency for the arm to unfold within the containment shell.

Having once latched the machine M in position with arm extended within the pressure vessel to form a track for the charge/discharge machine trolley, the winch in the containment shell is operated to lower down the well a fuel element transfer trolley 45 and a trolley winding and traversing motors 32. The latter fit into the part of the machine lying within the tube 14 by means of a spigot interconnection which brings into engagement the output shaft 75 of a motor 31 with a clutch 76 by means of which the extended arm of the machine may be rotated.

The shield plugs which have been previously removed are replaced and this allows, if necessary a man to enter the containment shell. It is to be noted that the shield plugs 16 have channels therein to allow the passage of electrical supplies and hoist cables which extend down to the charge machine M.

Electrical connection between the supply cables and the machine is made by way of a connector which allows relative rotation to occur between the cables and the machine without interruption of the supply.

FIGURE 3 shows the charge/discharge machine with its beam unfolded, corresponding to the position shown in FIGURES 2c and 2d, the machine being supported near the lower end of the tube 14.

As shown in FIG. 5 the machine M includes a non-rotary section 34a on which the end face 26 is formed and a rotary section 34b rotatable on the axis of the tube 14. The section 34a transmits the weight of the machine to the liner tube 14 and has a ball catch 70 which, by engaging a depression 71, in the inner surface of the liner tube, locks the machine against upward movement. The section 34a carries ball bearings 72 from which the rotary section 34b is suspended and bearings 73 for a drive shaft 74. The latter is connected to be driven by a motor shaft 75 through a clutch 76 and a pinion 77 meshing with an internally toothed annulus 78. The disposition of the annulus 78 is such that a subassembly including the drive motor 31 for the pinion 77, the drive motor 32 for the cable drum on the load/unload trolley, can spigot as a unit on to the upper part of non-rotary section 34a.

A lifting ring 79 is carried coaxially with and by the section 34a and provides a series of cutaway slots 80 for engagement by the grapple of the winch 24a in the containment shell 22.

The lower end of the ring 79 has inwardly projecting bosses 81 to which is bolted a housing for a swivel ball 82. The latter is anchored in the housing by a nut and bolt 83. The ball 82 is mounted on the terminal portion 35a of a tie rod 35 which extends downwardly in a split portion 34c which as shown in FIG. 5 forms part of the rotary section 34b and depends therefrom. The portion 34c is split along one wall to allow folding action of the beam described below and presents a slide 84 which as shown in FIG. 6 is engaged by slideway 85 and allows the lifting ring 79 and the tie rod 35 to be raised and lowered in alignment with one another.

Whilst in the drawing only one tie rod is shown this is in fact one of a pair of parallel tie rods, which can be appreciated by considering FIG. 5 as one half of an axial cross-section, the other half of which is similar.

The lower end 35b of the tie rods 35 carry a stirrup plate 37 which straddles a horizontal platform 38. The latter closes the end of the split portion 34c of the tube 34 and is horizontal in all operative positions of the mechanism. A hinge pin 39 is fixedly mounted in the stirrup plate 37 and pivoted on this pin is a first folding beam section 40. A small channel member 41 has its flanges fixed to the hinge pin and its web portion abutting the inner face of the wall of the tube 34. To the end of the first folding beam section 40 is pivoted at fulcrum 42, a second beam section 43 which, in the position shown in FIGURE 3, forms an extension of the first beam section 40. Together the first beam section 40 and the section 43 provide a horizontally extending track 44 for a trolley 45 which is retained on the track in a captive manner but may be removed therefrom for maintenance when located on the horizontal platform 38. Removal of the trolley 45 may be effected by the hoist in the container shell after the motors 31 and 32 have been removed by means of the hoist cable (not shown). The reason for the hinged mounting of section 43, as will be appreciated, is to allow the effective radius served by the trolley 45 to be large in relation to the amount of head room in the plenum chamber 12 for unfolding the beam from the tube section 34a after the machine has been introduced into the plenum. In this connection the bottom of the heat exchangers is indicated by a chain dotted line 7. To control the pivotal unfolding of the hinged section 43, a sprocket 46 is rotatably mounted on a fixed bearing 47 on the beam section 40 and is arranged to drive via chain drive 48 a second sprocket 49 fixed on the hinge fulcrum 42 of the hinged section 43.

An arm 50 is pivoted at 50a to the lower end of the rotatable tube section 34b and at its other end to a part of the beam 40 between the sprockets 46 and 49. Two links 51, 52, are pivoted at 51b and 52a respectively on the arm 50 and beam 40 so that their free ends are free to pivot on a common hinge pin 53 retained in a slot 54 cut in a plate 55 such that throughout the whole range of movement of the mechanism the links 51, 52, do not come into alignment.

The plate 55 is made to rotate with the sprocket 46 through intermediate gearing, if necessary.

The folding action of the machine is best followed if one considers the movement of the beam being moved from its open position (FIG. 3) to its closed folded position (FIG. 4). The trolley 45 is first moved to a position on the horizontal platform 38.

The winch in the containment shell attached to the casing 30 is operated causing a direct upwards pull to be applied to disengage the spigotted connection of which are the motors 31, 32, then removed and placed in the containment shell. The hoist grapple is then engaged into slots 80 in the lifting tube 79 to lift the tie rods 35. The platform 38 moves vertically maintaining its horizontal attitude and at the same time the beam 40 and rod 50 pivot clockwise about their respective pivots 39 and 50a.

Owing to relative disposition of pivots 51b, 52a, of the links 51, 52, the ends of these links adjacent these pivots tend to move towards one another and an anti-clockwise movement is applied to the sprocket 46 by the link pin 53 acting through the slotted plate 55. The gearing between the sprocket 46 and sprocket 49 is such that for a small degree of rotation of the former the latter rotates 180° so folding the hinged extension anti-clockwise about 42. Thus by the time the beam 40 has been fully retracted into the tube 34a the extension 43 is folded into a vertical position (FIG. 4).

To re-erect the beam the reverse procedure is followed. Upon the hoist cable becoming slack as the casing 30 engages the internal shoulder on the wall of the tube 14, the folding position of the beam is unlatched and the tie rod begins to move downwards.

The relative position of the pivots 39, 42, and 50a are such that the arm 50 pivots anti-clockwise outwards through the split portion 34c of tube section 34b and the beam 40 similarly moves outwardly—both arm and beam clearing the heat exchangers. Simultaneously also the pivots 51b, 52a will diverge so rotating the sprocket clockwise and unfolding the extension 43, The beam and extension 43 lock on reaching the horizontal position.

The trolley 45 has its own propulsion motor, not shown, and remote viewing system 60 and winch drum 61. The latter is powered from the winding motor 32 by an electric cable 62 which also supplies all the units i.e. propulsion motor, video camera etc. on the trolley 45. The cable which passes over the winch drum 61 terminates in a grapple for engaging fuel elements, which then can be raised and lowered with respect to the core. By operation of the propulsion motor and rotation of the beam the grapple can be positioned in polar co-ordinates anywhere over the core. Fuel elements are transferred into and out of the pressure vessel via the transfer channel through the reflector. Preferably two such channels are provided together with duplicate fuel element handling equipment at the lower end of each transfer chute.

We claim:

1. A charge machine for a nuclear reactor core situated within a pressure vessel having a penetration therein through which the machine is introducible for operation, the machine comprising a housing arranged to extend into and through the penetration, a track for a charging trolley hingedly mounted within said housing by a first hinge connection and pivotal about the connection to an unfolded position, a track extension hingedly mounted by a second hinge connection on the track so as to be pivotable between positions in which the extension lies co-extensive with the track in the folded position or to form an extension thereof in an unfolded position and actuating means operative to unfold said track extension in response to pivotal movement of the track about said first hinged connection to unfold the track from said housing.

2. A charge machine as claimed in claim 1 including means for rotatably supporting the housing in the penetration.

3. A charge machine as claimed in claim 1 including an arm pivotably mounted at each of its ends to the housing and the track and a mechanism for driving the track extension between its folded and unfolded positions, said mechanism being driven by relative movement between the arm and the track as the latter pivots about the first hinge connection.

4. A charge machine as claimed in claim 1 in which the second hinge connection has a first gear wheel rotatable with the extension, a geared driving connection between said gear wheel and a second gear wheel mounted on the track, the second gear wheel being rotated by a slider crank mechanism actuated by relative movement between the arm and the track as the latter pivots about the first hinged connection.

5. A charge machine as claimed in claim 1 in which the second hinge connection has a first gear wheel rotatable with the track extension, a geared driving connection between said gear wheel and a second gear wheel mounted on the track, the second gear wheel being rotated by a slider crank mechanism actuated by relative movement between the arm and the track as the latter pivots about the first hinged connection, links pivoted respectively on said arm and said track, a pin interconnecting the free ends of the links and slidable in a slideway in a crank carried by said second gear to rotate the crank.

6. A charge machine as claimed in claim 1 in which the second hinge connection has a first gear wheel rotatable with the track extension, a chain and sprocket driving connection between said gear wheel and a second gear wheel mounted on the track, the second gear wheel being rotated by a slider crank mechanism actuated by relative movement between the arm and the track as the latter pivots about the first hinged connection, links pivoted respectively on said arm and said track, a pin interconnecting the free ends of the links and slidable in a slideway in a crank carried by said second gear to rotate the crank.

References Cited

UNITED STATES PATENTS

| 3,025,226 | 3/1962 | Martin et al. | 176—32 |
| 3,104,217 | 9/1963 | Long | 176—30 |
| 3,140,238 | 7/1964 | Fraas et al. | 176—30 |
| 3,179,569 | 4/1965 | Fortescue et al. | 176—30 |
| 3,205,143 | 9/1965 | Lemesle et al. | 176—30 |

L. DEWAYNE RUTLEDGE, *Primary Examiner.*